(12) United States Patent
Hoang et al.

(10) Patent No.: US 11,001,382 B2
(45) Date of Patent: May 11, 2021

(54) BYPASS FLOW REGULATOR

(71) Applicant: B/E Aerospace, Inc., Winston Salem, NC (US)

(72) Inventors: Thao Hoang, Arlington, WA (US); Yen Chuh, Irvine, CA (US); Kristin R. Noriega, Snohomish, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 260 days.

(21) Appl. No.: 16/280,761

(22) Filed: Feb. 20, 2019

(65) Prior Publication Data
US 2020/0262560 A1 Aug. 20, 2020

(51) Int. Cl.
| | |
|---|---|
| *B01D 19/00* | (2006.01) |
| *B64D 11/02* | (2006.01) |
| *B01D 45/16* | (2006.01) |
| *B04C 9/00* | (2006.01) |
| *B01D 50/00* | (2006.01) |
| *G05D 7/01* | (2006.01) |
| *B01D 46/24* | (2006.01) |
| *B01D 46/42* | (2006.01) |
| *B01D 46/00* | (2006.01) |
| *E03D 3/10* | (2006.01) |
| *B04C 5/04* | (2006.01) |
| *B04C 5/13* | (2006.01) |
| *B04C 5/26* | (2006.01) |

(52) U.S. Cl.
CPC ............ *B64D 11/02* (2013.01); *B01D 45/16* (2013.01); *B04C 9/00* (2013.01); *B01D 46/003* (2013.01); *B01D 46/2411* (2013.01); *B01D 46/4272* (2013.01); *B01D 50/002* (2013.01); *B04C 5/04* (2013.01); *B04C 5/13* (2013.01); *B04C 5/26* (2013.01); *B04C 2005/136* (2013.01); *B04C 2009/004* (2013.01); *E03D 3/10* (2013.01); *G05D 7/0133* (2013.01)

(58) Field of Classification Search
CPC .... B01D 50/002; B01D 45/16; B01D 46/003; B01D 46/2411; B01D 46/4272; B64D 11/02; E03D 3/10; B04C 9/00; B04C 5/04; B04C 5/15; B04C 5/26; B04C 2009/004; B04C 2005/136; B04C 5/13; G05D 7/0133
See application file for complete search history.

(56) References Cited

U.S. PATENT DOCUMENTS

| | | | |
|---|---|---|---|
| 2,113,586 A | * | 4/1938 | Fraser ..................... B07B 7/08 209/139.2 |
| 6,453,481 B1 | | 9/2002 | Pondelick et al. |
| 6,468,426 B1 | | 10/2002 | Klass |
| 7,082,967 B2 | | 8/2006 | Sarajian et al. |

(Continued)

*Primary Examiner* — Dung H Bui
(74) *Attorney, Agent, or Firm* — Suiter Swantz pc llo

(57) ABSTRACT

A bypass flow regulator for a vacuum waste system (VWS) is disclosed. The bypass flow regulator includes a valve assembly installable in an aircraft vent line leading outside the aircraft from an onboard VWS waste tank. The vent line directs an airstream pumped from the waste tank to an external outlet under suction (from which outlet the airstream is ejected from the aircraft). The valve assembly includes a group of valves (e.g., umbrella valves) set into the path of the airstream. The valves may collectively modulate the flow rate of the airstream by adjusting their effective flow area.

12 Claims, 5 Drawing Sheets

(56) References Cited

U.S. PATENT DOCUMENTS

| | | | | |
|---|---|---|---|---|
| 7,278,445 B2* | 10/2007 | Marvin | ............... | A43B 1/0072 |
| | | | | 137/601.2 |
| 7,998,250 B2 | 8/2011 | Pondelick et al. | | |
| 7,998,251 B2 | 8/2011 | Pondelick et al. | | |
| 8,291,525 B2 | 10/2012 | Pondelick et al. | | |
| 8,607,370 B2 | 12/2013 | Hoang et al. | | |
| 2009/0300872 A1* | 12/2009 | Griffith | ................ | A47L 9/1608 |
| | | | | 15/347 |
| 2010/0083832 A1* | 4/2010 | Pondelick | ................ | B04C 9/00 |
| | | | | 95/261 |
| 2014/0007966 A1* | 1/2014 | McBride | .............. | F16K 3/0209 |
| | | | | 137/629 |
| 2018/0213985 A1* | 8/2018 | Song | ................... | A47L 9/1683 |

* cited by examiner

BYPASS FLOW REGULATOR

CROSS-REFERENCE TO RELATED APPLICATIONS

This application relates to the following applications concurrently filed herewith and each incorporated herein in its entirety by these references: U.S. patent application Ser. No. 16/280,623 entitled INTEGRATED VORTEX SEPARATOR and having attorney docket number MA219-04; and U.S. patent application Ser. No. 16/280,700 entitled INLINE VORTEX DEMISTER and having attorney docket number MA219-07.

BACKGROUND

A vacuum waste system aboard an aircraft collects solid and liquid waste from toilets and other receptacles (e.g., lavatories disposed throughout the aircraft cabin) via piping connecting the toilet bowl or receptacle to a waste tank. Waste products can be transported from the bowl or receptacle through the piping and into the tank for storage by pumping air from the waste tank to induce suction. At higher altitudes, suction may be induced based on the pressure differential between the pressurized aircraft cabin and the thinner atmosphere exterior to the aircraft, whereby air is drawn from the waste tank by the resulting suction and expelled from the aircraft through a vent line. Currently access to the vent line is controlled by a binary check valve that is either fully open or fully closed. As the flow rate cannot be regulated or modulated by the binary valve, the flow rate is a function of the pressure differential and thus, at higher altitudes, may exceed the capacity of the vacuum waste system to remove solid or liquid waste components from the airstream prior to expulsion from the waste tank. For sanitary reasons, it is clearly preferable for an airstream pumped from the waste tank and ejected into the atmosphere to contain no solid waste particles. Similarly, the exiting airstream should be free of moisture that may condense or freeze, obstructing the vent line.

SUMMARY

A bypass flow regulator is disclosed. In embodiments, the bypass flow regulator includes a valve assembly installable in an aircraft vent line leading outside the aircraft from an onboard vacuum waste system (VWS); the vent line directs an airstream pumped from a waste tank of the VWS to an external outlet under suction (from which outlet the airstream is ejected from the aircraft). The valve assembly includes a group of valves set into the path of the airstream; the valves may collectively modulate the flow rate of the airstream by adjusting their effective flow area.

In some embodiments, the valves include umbrella valves.

In some embodiments, the valves collectively modulate the flow rate of the airstream to a predetermined maximum flow rate lower than the flow rate through an unobstructed vent line.

In some embodiments, the VWS induces suction (drawing the airstream from the waste tank) based on the pressure differential between the aircraft cabin and the atmospheric pressure external to the aircraft. The predetermined maximum flow rate corresponds to the pressure differential, e.g., at a given altitude.

In some embodiments, the valves include valves fashioned of a flexible material.

In some embodiments, the valves include valves capable of moderating the flow rate by partially deforming.

A vacuum waste system (VWS) is also disclosed. In embodiments, the VWS includes an aircraft-based waste tank capable of receiving a waste stream (e.g., from an aircraft toilet bowl or receptacle) under suction through a waste inlet. The VWS includes an integrated vortex separator (IVS) mounted to the waste tank and in communication with the waste inlet. The IVS generates a vortex flow by redirecting the waste stream to remove solid and liquid waste components (e.g., centrifugally), resulting in a primary airstream expelled from the waste tank under suction via an exhaust port. The VWS includes a vent line leading from the exhaust port to an external outlet of the aircraft, through which the primary airstream is directed under suction. The VWS includes a bypass flow regulator (BFR) in the vent line, the BFR including an assembly of valves in the path of the primary airstream and capable of modulating its flow rate by collectively adjusting their effective flow area.

In some embodiments, the VWS further includes a vacuum generator in communication with the vent line. At lower altitudes, the vacuum generator induces suction in the VWS (e.g., to draw waste streams into the waste tank) by pumping air from the waste tank. At higher altitudes, suction may be induced based on the pressure differential between the aircraft cabin pressure and the atmospheric pressure external to the aircraft.

In some embodiments, the valves collectively modulate the flow rate of the airstream to a predetermined maximum flow rate lower than the flow rate through an unobstructed vent line.

In some embodiments, the valves include umbrella valves.

In some embodiments, the valves include valves fashioned of a flexible material or valves capable of moderating the flow rate by partially deforming.

In some embodiments, the IVS includes outer and inner inverted conical structures with a conical cavity therebetween. The outer cone includes spaced apart radial vanes extending inward therefrom, the vanes oriented at angles to the vertical and defining portals therebetween to generate the vortex flow within the IVS by redirecting the waste stream.

A two-stage vacuum waste system (VWS) is also disclosed. In embodiments, the VWS includes an aircraft-based waste tank capable of receiving a waste stream (e.g., from an aircraft toilet bowl or receptacle) under suction through a waste inlet. The VWS includes a diverter mounted to the waste tank and in communication with the waste inlet. The diverter generates a vortex flow by redirecting the waste stream to remove solid and liquid waste components (e.g., centrifugally), resulting in a primary airstream. The primary airstream is drawn under suction into a demister assembly, which generates a second vortex flow by redirecting the primary airstream and removes additional liquid components therefrom, resulting in a substantially moisture-free airstream. The VWS includes a vent line leading from the exhaust port to an external outlet of the aircraft, through which the moisture-free airstream is directed under suction. The VWS includes a bypass flow regulator (BFR) in the vent line, the BFR including an assembly of valves in the path of the moisture-free airstream and capable of modulating its flow rate by collectively adjusting their effective flow area.

In some embodiments, the VWS further includes a vacuum generator in communication with the vent line. At lower altitudes, the vacuum generator induces suction in the VWS (e.g., to draw waste streams into the waste tank) by pumping air from the waste tank. At higher altitudes, suction may be induced based on the pressure differential between the aircraft cabin pressure and the atmospheric pressure external to the aircraft.

In some embodiments, the valves collectively modulate the flow rate of the airstream to a predetermined maximum flow rate lower than the flow rate through an unobstructed vent line.

In some embodiments, the predetermined maximum flow rate may be based on one or more of the pressure differential and the maximum capacity of the diverter/demister system to remove solid and liquid waste from the airstream.

In some embodiments, the valves include umbrella valves.

In some embodiments, the diverter includes outer and inner inverted conical structures with a conical cavity therebetween. The outer cone includes spaced apart radial vanes extending inward therefrom, the vanes oriented at angles to the vertical and defining portals therebetween to generate the vortex flow within the diverter by redirecting the waste stream.

In some embodiments, the demister includes an outer chamber capable of receiving under suction the airstream treated by the diverter. The outer chamber includes spaced apart radial vanes extending inward therefrom, the vanes oriented at angles to the vertical and defining portals therebetween to generate the second vortex flow within the demister by redirecting the airstream received from the diverter.

The demister includes an inner chamber within the outer chamber, which receives the second vortex flow therefrom through air scoops or ports connecting the outer and inner chambers. The inner chamber includes additional filtering media which remove moisture from the second vortex flow resulting in a substantially moisture-free airstream which is removed from the demister and expelled from the system via an exhaust port in communication with a vent line.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
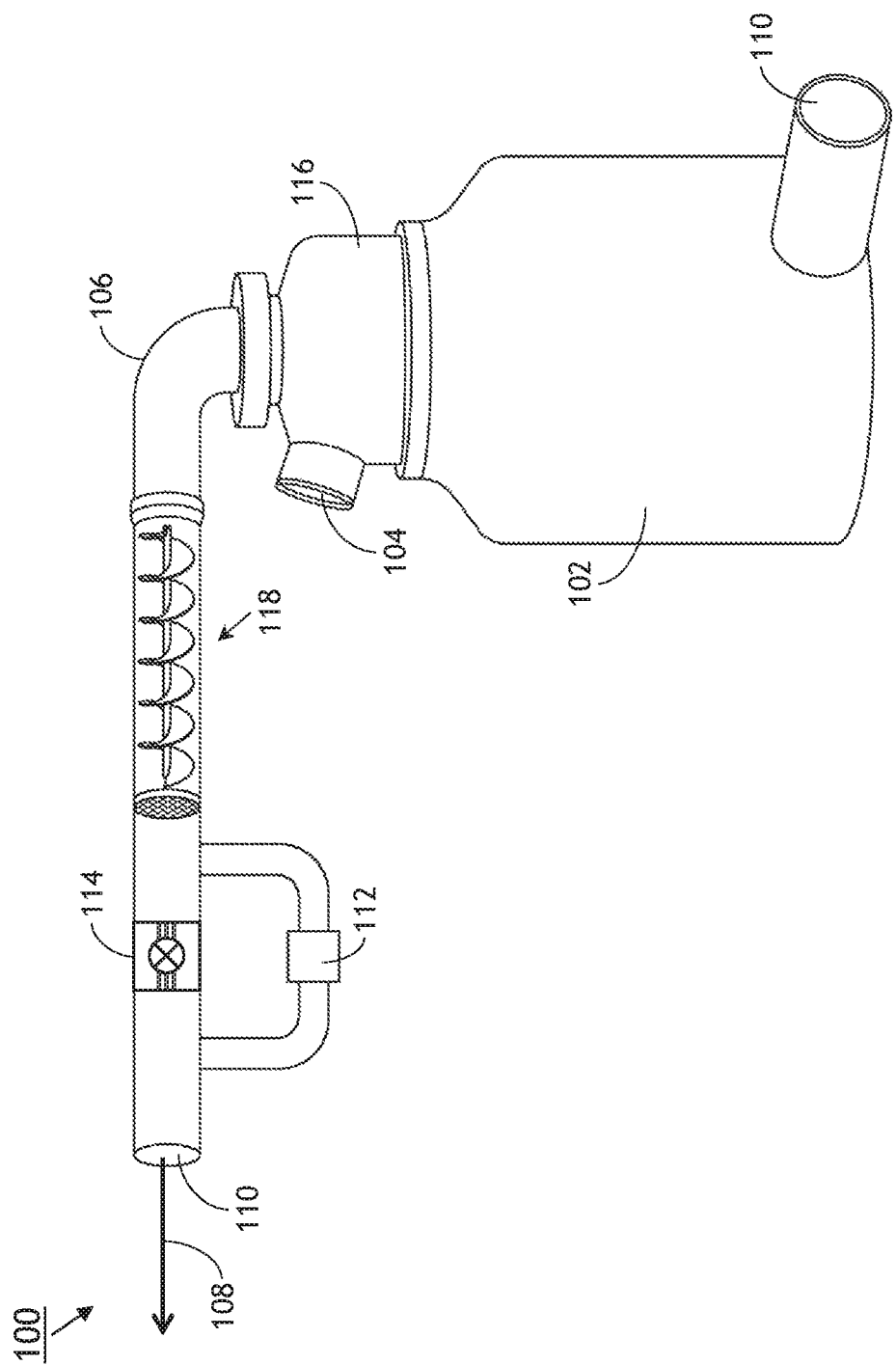
FIG. 1 is a diagrammatic illustration of a vacuum waste system (VWS) in accordance with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., $1$, $1a$, $1b$). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

A bypass flow regulator for an aircraft-based vacuum waste system (VWS) is disclosed. The bypass flow regulator replaces a binary check valve responsible for switching suction generation control between an onboard vacuum generator (at lower altitudes) and the pressure differential between normal cabin pressure and the atmospheric pressure external to the aircraft. The bypass flow regulator enables modulation of the flow rate of the airstream expelled from the VWS waste tank to a predetermined maximum such that the outbound flow rate of the airstream is prevented from exceeding the capacity of the VWS to remove solid and liquid waste components from the airstream, preventing these waste components from being ejected into the atmosphere or obstructing the outbound airflow as condensed or frozen moisture.

Referring to FIG. 1, a portion of a vacuum waste system 100 (VWS) is shown. The VWS 100 may collect solid and liquid waste products from toilets and other receptacles (e.g., installed in lavatories) aboard an aircraft, storing the waste products (e.g., waste streams) in a waste tank 102. The waste tank 102 may be connected to one or more toilet bowls or waste receptacles by piping connected to a waste inlet 104. For example, when the toilet is flushed, the VWS 100 may induce negative pressure within the waste tank 104 by pumping air out of the waste tank through a vent line 106 or air outlet. The waste inlet 104 may be angled downward, relative to the horizontal, so that gravity may assist the suction of waste into the waste tank 102 via the waste inlet. The vent line 106 may expel an airstream (108) from the waste tank, and into the surrounding atmosphere, via an external outlet 110. The resulting pressure differential between the interior of the waste tank 102 (e.g., at reduced pressure) and the aircraft cabin (e.g., at normal pressure) induces suction, propelling the waste stream through the piping and into the waste tank 102, where it may be stored for later removal (e.g., after landing) via a drain outlet 110.

While the aircraft is on the ground or at lower altitudes (below a target altitude, e.g., 16,000 feet), a vacuum generator 112 connected to the vent line 106 may operate during flush sequences to generate the necessary pressure differential and thereby induce suction. Above a target altitude, suction may be induced by the pressure differential between the interior cabin pressure and atmospheric pressure external to the aircraft (as the surrounding air is sufficiently thin at higher altitudes). A bypass flow regulator 114 may be activated (e.g., by an onboard control system when the aircraft reaches sufficient altitude) to manage outflow of the airstream 108 through the vent line 106 to the external outlet 110 at higher altitudes. For example, as the aircraft gains altitude, the surrounding atmosphere becomes thinner and the pressure differential with the (pressurized) cabin interior correspondingly greater. The bypass flow regulator 114 may incorporate adjustable valves in the vent line 106 which restrict the flow rate of the airstream during flush sequences so that the capacity of the VWS 100 to remove solid and liquid waste components from the airstream before the airstream enters the vent line is not exceeded by the flow rate.

The VWS 100 may include a vortex separator 116 (e.g., diverter) in communication with the waste inlet 104 and mounted to the waste tank 102. During flush sequences, as the waste stream enters the waste tank 102 and air is removed from the waste tank, the vortex separator 116 may act on the incoming waste stream in multiple stages to remove solid and liquid waste components from the airstream 108 before the airstream enters the vent line 106. The resulting solid and liquid waste components may drop or condense into the waste tank 102. In some embodiments, the VWS 100 may incorporate a two-stage separator/demister apparatus for removing solid and liquid components from the waste stream; alternatively or additionally, the VWS may incorporate an additional demister 118 in the vent line 106 to remove moisture from the airstream after it is drawn out of the waste tank 102.

Figure 2:
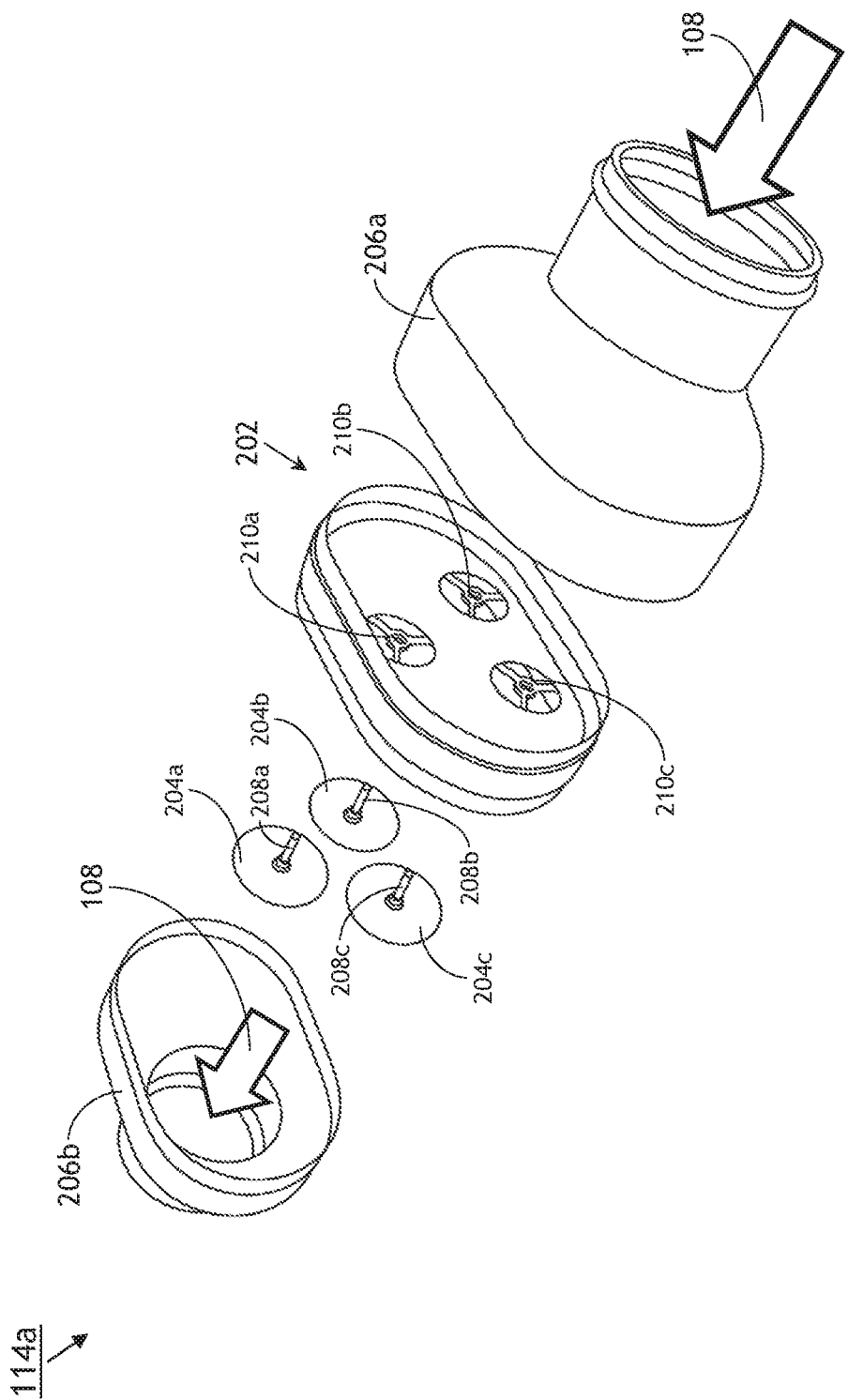
FIG. 2 is an isometric exploded view of a bypass flow regulator of the VWS of FIG. 1, FIGS. 3A through 3D are profile exploded views of the bypass flow regulator of FIG. 2.

Referring to FIG. 2, the bypass flow regulator 114a may be implemented and may function similarly to the bypass flow regulator 114 of FIG. 1, except that the bypass flow regulator 114a may include a valve assembly 202 incorporating one or more umbrella valves 204a-c. The valve assembly 202 may be enclosed within a two-piece housing (206a-b) installed into the vent line (106, FIG. 1), e.g., in place of a binary check valve via which the vent line may be either fully open (at higher altitudes) or fully closed (at lower altitudes).

The stems 208a-c of the umbrella valves 204a-c may be set into seats 210a-c within the vent line 106 in the path of the exiting airstream 108, e.g., between the points where the airstream leaves the vortex separator (116, FIG. 1) of the waste tank (102, FIG. 1) and the airstream reaches the external outlet 110 (from which latter outlet the airstream is drawn into the surrounding environment). The valve assembly 202 may incorporate three umbrella valves 204a-c as shown by FIG. 2; in some embodiments, the valve assembly may incorporate two, four, five, or any other appropriate number and size of umbrella valves. Further, the valve assembly 202 may incorporate any other type of valve capable of changing its effective flow area to modulate the flow rate of the airstream 108. The umbrella valves 204a-c may be fashioned of nitrile or any similarly flexible, semi-rigid, or rigid material.

At lower altitudes (and higher external atmospheric pressures), the bypass flow regulator 114a may seal off the external outlet (108, FIG. 1) such that evacuation of air from the waste tank (102, FIG. 1) is controlled by the vacuum generator (112, FIG. 1). At higher altitudes, when evacuation of the airstream 108 from the waste tank 102 is controlled by the pressure differential between interior cabin pressure and the lower pressure of the atmosphere external to the aircraft, the bypass flow regulator 114a may modulate the flow rate of the exiting airstream, e.g., so that the flow rate does not exceed the capacity of the vortex separator (116, FIG. 1) to remove solid and liquid waste components from the airstream before expulsion through the vent line (106, FIG. 1).

Figure 3A:
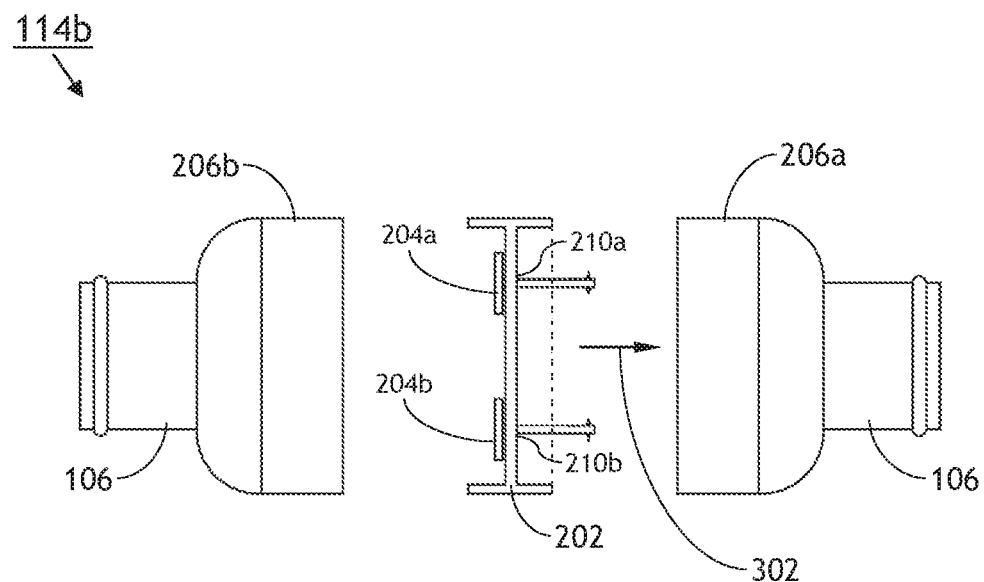

Referring to FIG. 3A, the bypass flow regulator 114b may be implemented and may function similarly to the bypass flow regulators 114, 114a of FIGS. 1 and 2, except that the bypass flow regulator 114b may, at lower altitudes, substantially seal off the vent line 106 from access to the external outlet (110, FIG. 1). Under a predetermined target altitude (e.g., 16,000 feet), the VWS (100, FIG. 1) may respond to the initiation of a flush sequence (e.g., triggered by the flushing of a toilet in communication with the VWS) by activating the vacuum generator (112, FIG. 1) to pump air from the waste tank (102, FIG. 1) and induce suction such that the contents of the toilet bowl are drawn into the waste tank. For example, the umbrella valves 204a-b may rest against their corresponding seats 210a-b, held in place by the negative pressure (302) in the vent line 106 induced by the vacuum generator 112.

Figure 3B:
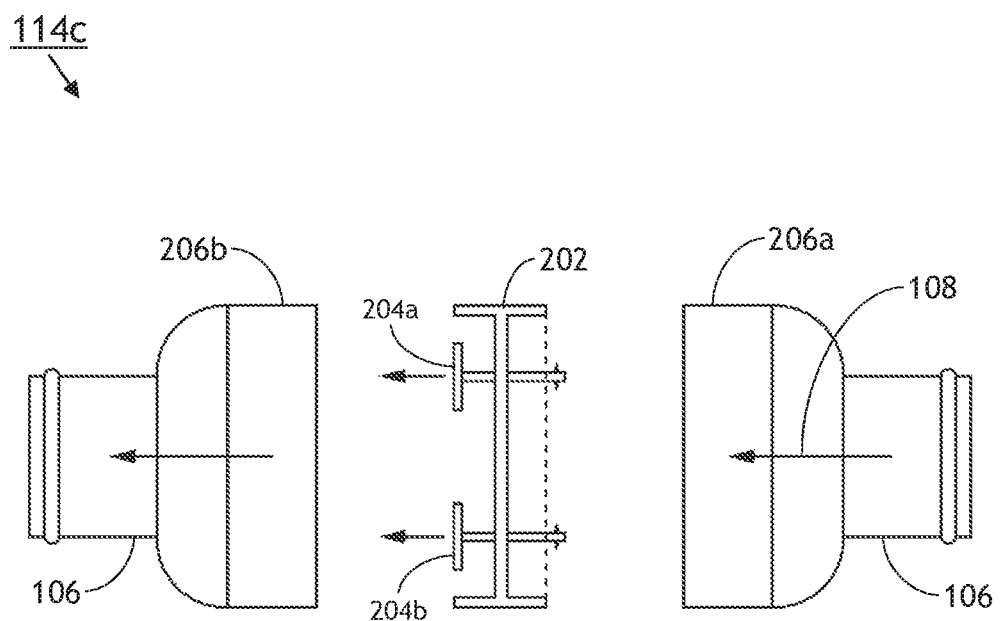

Referring to FIG. 3B, the bypass flow regulator 114c may be implemented and may function similarly to the bypass flow regulator 114b of FIG. 3A, except that the bypass flow regulator 114c may, at higher altitudes above the target altitude, open partially to allow the VSW 100 to induce suction based on the pressure differential between the interior cabin pressure and the thinner atmosphere external to the aircraft, allowing the airstream 108 to escape the aircraft through the vent line 106 and drawing a waste stream from a toilet bowl or receptacle aboard the aircraft (e.g., in an aircraft lavatory and thus at normal cabin pressure) into the waste tank 102 for storage. However, the umbrella valves 204a-b may open only partially to modulate the flow rate of the airstream 108 to no more than a predetermined maximum flow rate, e.g., an optimal flow rate based on the current altitude and/or pressure differential or on the performance capacity of the vortex separator 116.

Figure 3C:
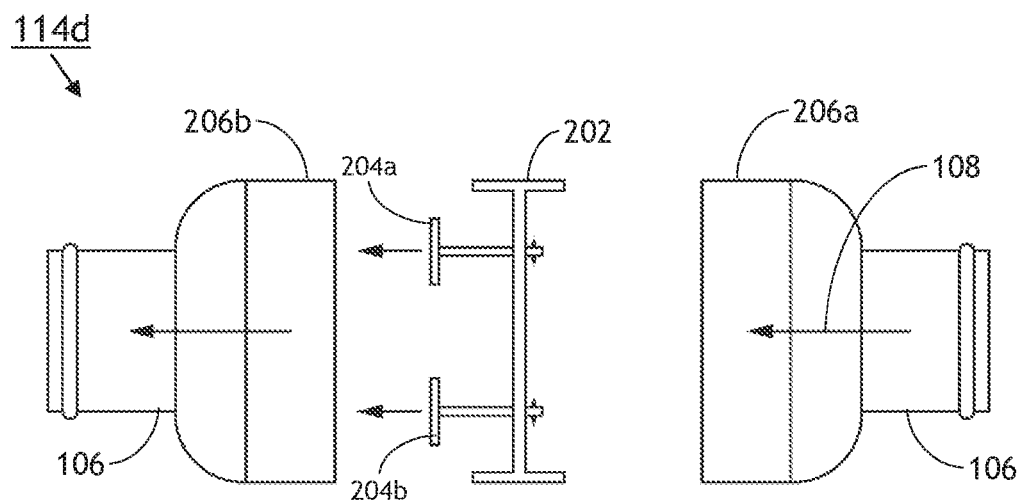

Referring to FIG. 3C, the bypass flow regulator 114d may be implemented and may function similarly to the bypass flow regulator 114c of FIG. 3B, except that the bypass flow regulator 114d may reflect operation of the VWS (100, FIG. 1) at a higher altitude than the bypass flow regulator 114c. For example, when the aircraft is operating at an optimal cruising altitude (e.g., between 35,000 and 42,000 feet), the umbrella valves 204a-b may be calibrated for maximum output. The pressure differential at this altitude may be greater than in FIG. 3B, as the atmosphere is significantly thinner. However, the umbrella valves 204a-b may modulate the flow rate of the airstream 108 to an optimal flow rate below the maximum flow rate otherwise possible via an unobstructed vent line 106.

Figure 3D:
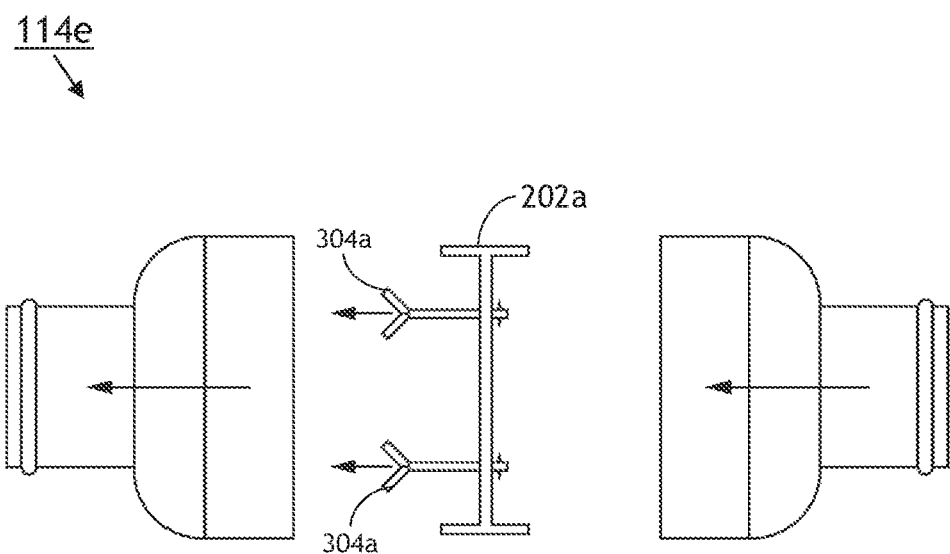
Figure 4:
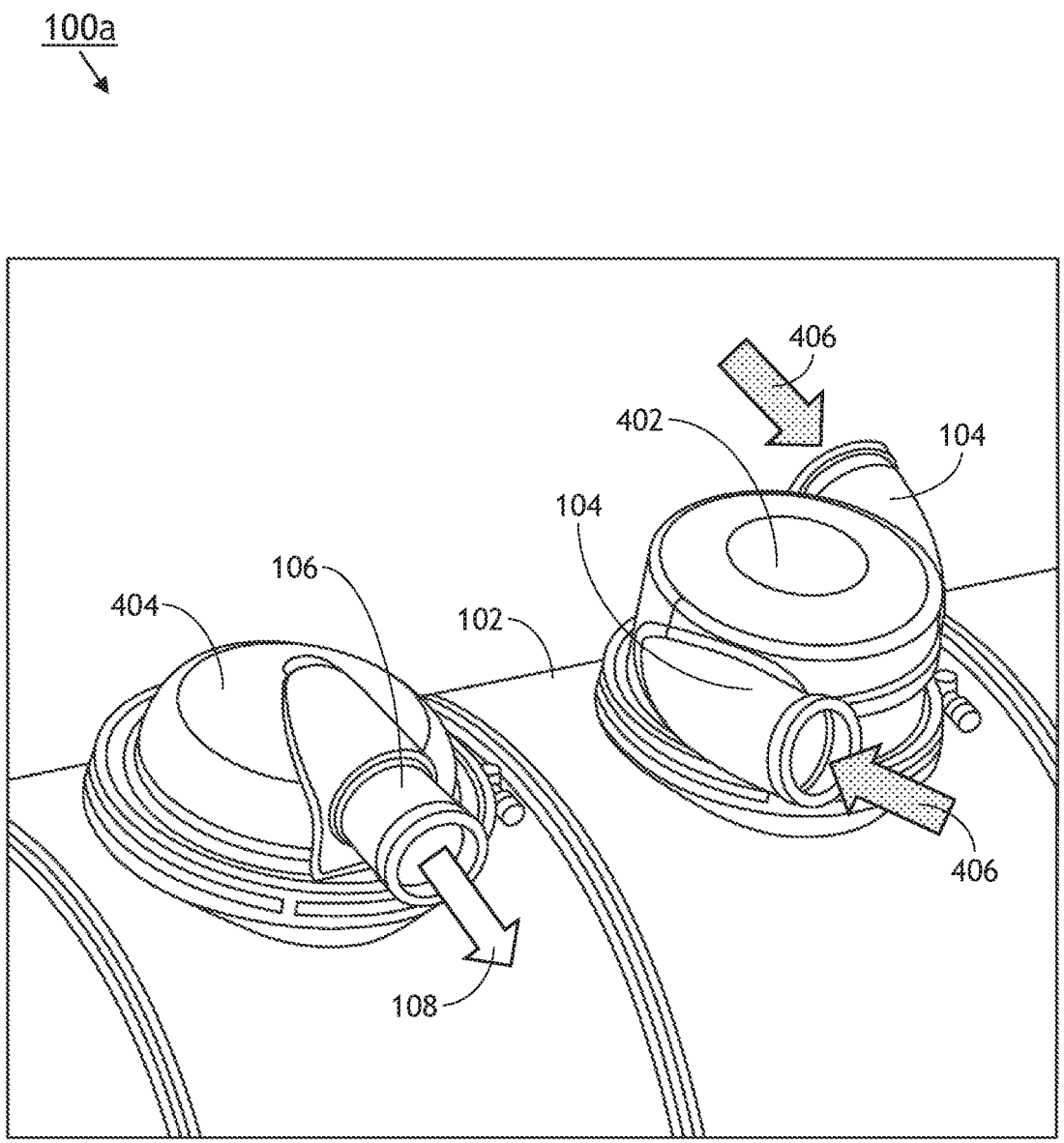
FIG. 4 is a partial isometric view of a VWS in accordance with example embodiments of this disclosure.

The optimal flow rate modulated by the bypass flow regulator 114d may be determined not only by the current altitude of the aircraft or the corresponding pressure differential, but by the size and/or composition of the umbrella valves 204a-b. Referring to FIG. 3D, the bypass flow regulator 114e and the valve assembly 202a may be implemented and may function similarly to the bypass flow regulator 114d and the valve assembly 202 of FIG. 3C, except that the valve assembly 202a may incorporate one or more flexible valves 304a-b capable of partially deforming in response to a pressure differential. For example, the valve assembly 202a may reflect operation of the VWS (100, FIG. 1) at a cruising altitude similar to that shown by the valve assembly 202 of FIG. 3C, except that the partial deformation of the flexible valves 304a-b may allow for a higher optimal flow rate than the umbrella valves 204a-b shown by FIG. 3C.

Referring now to FIG. 3, the VWS 100a may be implemented and may function similarly to the VWS 100 of FIG. 1, except that the VWS 100a may partially or fully separate the functionality of the vortex separator (116, FIG. 1) into a diverter assembly 402 and a demister assembly 404. For example, the diverter assembly 402 may be mounted to the waste tank 102 adjacent to, and in communication with, one or more waste inlets 104 to remove solid and liquid waste components from waste streams 406 entering the waste tank thereby. Similarly, the demister assembly 404 may be mounted to the waste tank 102 directly adjacent to the vent line 106 to remove any remaining moisture from the final-stage airstream 108 before the airstream leaves the waste tank via the vent line. In some embodiments, the bypass flow regulator 114, 114a-d of FIGS. 1 through 3C may be implemented in the vent line 106 to regulate the flow rate of the final-stage airstream toward the exterior outlet (110, FIG. 1).

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A vacuum waste system, comprising:
    a waste tank installable aboard an aircraft, the waste tank including at least one waste inlet capable of receiving a waste stream under suction from at least one of an aircraft toilet and an aircraft receptacle;
    an integrated vortex separator mounted to the waste tank and in communication with the waste inlet, the integrated vortex separator configured to:
        a) generate at least one vortex flow by redirecting the waste stream;
        b) produce a primary airstream by removing at least one of a solid component and a liquid component from the vortex flow; and
        c) expel the primary airstream from the waste tank under suction via an exhaust port;
    a vent line in communication with the exhaust port, the vent line configured to direct the primary airstream under suction to an external outlet of the aircraft; and
    a bypass flow regulator comprising a valve assembly disposed in the vent line, the valve assembly including a plurality of valves set in the path of the primary airstream, the plurality of valves configured to modulate a flow rate of the primary airstream by adjusting an effective flow area, wherein the plurality of valves includes at least one umbrella valve.

2. The vacuum waste system of claim 1, further comprising:
    a vacuum generator in communication with the vent line, the vacuum generator configured to induce the suction by creating a negative pressure within the waste tank when the aircraft is beneath a target altitude, the suction induced by a pressure differential between a cabin pressure of the aircraft and an atmospheric pressure external to the aircraft with the aircraft is at or above the target altitude.

3. The vacuum waste system of claim 1, wherein the plurality of valves are configured to collectively modulate a flow rate of the airstream to a predetermined maximum flow rate.

4. The vacuum waste system of claim 3, wherein the predetermined maximum flow rate is associated with at least one of the pressure differential and a maximum flow rate of the integrated vortex separator.

5. The vacuum waste system of claim 1, wherein the plurality of valves includes at least one of:
    a first valve fashioned of a flexible material; and
    a second valve configured to modulate the flow rate by at least partially deforming.

6. The vacuum waste system of claim 1, wherein the integrated vortex separator comprises:
    an outer inverted cone, an inner inverted cone, and a conical cavity therebetween; and
    a plurality of radial vanes extending inward from an inner surface of the outer inverted cone in a spaced apart relationship, the plurality of radial vanes oriented at one or more angles to vertical and defining a plurality of portals capable of generating the vortex flow by redirecting the waste stream.

7. A vacuum waste system, comprising:
    a waste tank installable aboard an aircraft, the waste tank including at least one waste inlet capable of receiving a waste stream under suction from at least one of an aircraft toilet and an aircraft receptacle;

an integrated vortex separator mounted to the waste tank and in communication with the waste inlet, the integrated vortex separator configured to:
  a) generate at least one first vortex flow by redirecting the waste stream; and
  b) produce a primary airstream by removing at least one of a solid component and a first liquid component from the first vortex flow;

a demister assembly mounted to the waste tank and in communication with the integrated vortex separator, the demister assembly configured to:
  a) generate at least one second vortex flow by redirecting the primary airstream; and
  b) produce a secondary airstream by removing at least one second liquid component from the second vortex flow;

an exhaust port coupled to the demister assembly, the exhaust port configured to remove the secondary airstream from the waste tank under suction;

a vent line in communication with the exhaust port, the vent line configured to direct the secondary airstream under suction to an external outlet of the aircraft; and a bypass flow regulator comprising a valve assembly disposed in the vent line, the valve assembly including a plurality of valves set in the path of the primary airstream, the plurality of valves configured to modulate a flow rate of the secondary airstream by adjusting an effective flow area, wherein the plurality of valves includes at least one umbrella valve.

8. The vacuum waste system of claim 7, further comprising:
  a vacuum generator in communication with the vent line, the vacuum generator configured to induce the suction by creating a negative pressure within the waste tank when the aircraft is beneath a target altitude, the suction induced by a pressure differential between a cabin pressure of the aircraft and an atmospheric pressure external to the aircraft with the aircraft is at or above the target altitude.

9. The vacuum waste system of claim 8, wherein the plurality of valves are configured to collectively modulate a flow rate of the airstream to a predetermined maximum flow rate.

10. The vacuum waste system of claim 9, wherein the predetermined maximum flow rate is associated with at least one of the pressure differential and a maximum flow rate of the integrated vortex separator.

11. The vacuum waste system of claim 7, wherein the integrated vortex separator comprises:
  an outer inverted cone, an inner inverted cone, and a conical cavity therebetween; and
  a plurality of radial vanes extending inward from an inner surface of the outer inverted cone in a spaced apart relationship, the plurality of radial vanes oriented at one or more angles to vertical and defining a plurality of portals capable of generating the first vortex flow by redirecting the waste stream.

12. The vacuum waste system of claim 7, wherein the demister assembly comprises:
  an outer chamber capable of receiving under suction the primary airstream from the integrated vortex separator;
  a plurality of radial vanes extending inward from an inner surface of the outer chamber in a spaced apart relationship, the plurality of radial vanes oriented at one or more angles to vertical and defining a plurality of portals capable of generating the second vortex flow by redirecting the primary airstream; and
  an inner chamber disposed within the outer chamber and in communication therewith via at least one port set into an inner surface of the outer chamber, the inner chamber configured to receive the second vortex flow and including at least one filter capable of producing the secondary airstream by removing the second liquid component from the second vortex flow.

* * * * *